(12) United States Patent
Rudnick et al.

(10) Patent No.: US 8,488,589 B2
(45) Date of Patent: *Jul. 16, 2013

(54) SYSTEM AND METHOD FOR COMMUNICATING OVER MESH NETWORKS WAVEFORM-ENHANCED, LINK-STATE ROUTING

(75) Inventors: William M. Rudnick, Pittsford, NY (US); Stephen G. Sherman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,194

(22) Filed: May 30, 2012

(65) Prior Publication Data
US 2012/0236724 A1    Sep. 20, 2012

Related U.S. Application Data

(63) Continuation of application No. 11/676,736, filed on Feb. 20, 2007, now Pat. No. 8,213,409.

(51) Int. Cl.
*H04L 12/28*     (2006.01)

(52) U.S. Cl.
USPC ........... 370/351; 370/310; 370/315; 370/321; 370/337; 370/347

(58) Field of Classification Search
USPC .................................. 370/310–351
See application file for complete search history.

(56) References Cited

U.S. PATENT DOCUMENTS

| | | |
|---|---|---|
| 5,592,470 A | 1/1997 | Rudrapatna et al. .......... 370/320 |
| 6,097,707 A | 8/2000 | Hodzic et al. ................. 370/321 |
| 6,253,326 B1 | 6/2001 | Lincke et al. ................. 713/201 |
| 6,343,318 B1 | 1/2002 | Hawkins et al. .............. 709/219 |
| 6,397,259 B1 | 5/2002 | Lincke et al. ................. 709/236 |
| 6,590,588 B2 | 7/2003 | Lincke et al. ................. 345/744 |
| 6,728,514 B2 | 4/2004 | Bandeira et al. ............. 455/13.1 |
| 6,754,192 B2 | 6/2004 | Kennedy ....................... 370/331 |
| 6,763,014 B2 | 7/2004 | Kennedy ....................... 370/338 |
| 6,795,418 B2 | 9/2004 | Choi ............................. 370/336 |
| 6,798,761 B2 | 9/2004 | Cain et al. .................... 370/337 |

(Continued)

FOREIGN PATENT DOCUMENTS

WO    2005/117348    8/2005

OTHER PUBLICATIONS

Ren et al., "*An Adaptive Multi-Channel OLSR Routing Protocol Based on Topology Maintenance*," Mechatronics and Automation, 2005 IEEE International Conference Niagra Falls, On, Canada, Jul. 29, 2005, pp. 2222-2227.

(Continued)

*Primary Examiner* — Olumide T Ajibade Akonai
*Assistant Examiner* — Jaime Holliday
(74) *Attorney, Agent, or Firm* — Allen, Dyer, Doppelt, Milbrath & Gilchrist, P.A.

(57) ABSTRACT

A communication system includes a plurality of mobile nodes forming a mesh network. A plurality of wireless communication links connect the mobile nodes together. Each mobile node is formed as a communications device and operative for transmitting data packets wirelessly to other mobile nodes via the wireless communications link from a source mobile node through intermediate neighboring mobile nodes to a destination mobile node using a link state routing protocol and multiple waveforms.

25 Claims, 8 Drawing Sheets

U.S. PATENT DOCUMENTS

| | | | |
|---|---|---|---|
| 6,804,208 B2 | 10/2004 | Cain et al. | 370/326 |
| 6,845,091 B2 | 1/2005 | Ogier et al. | 370/338 |
| 6,850,532 B2 | 2/2005 | Thubert et al. | 370/401 |
| 6,901,064 B2 | 5/2005 | Cain et al. | 370/337 |
| 6,904,032 B2 | 6/2005 | Cain | 370/337 |
| 6,954,435 B2 | 10/2005 | Billhartz et al. | 370/252 |
| 6,954,449 B2 | 10/2005 | Cain et al. | 370/337 |
| 6,958,986 B2 | 10/2005 | Cain | 370/337 |
| 6,975,863 B1 | 12/2005 | Miernik | 455/434 |
| 6,980,537 B1 | 12/2005 | Liu | 370/338 |
| 6,982,987 B2 | 1/2006 | Cain | 370/442 |
| 6,990,080 B2 | 1/2006 | Bahl et al. | 370/254 |
| 7,027,409 B2 | 4/2006 | Cain | 370/252 |
| 7,119,676 B1 | 10/2006 | Silverstrim et al. | 340/531 |
| 2002/0039357 A1 | 4/2002 | Lipasti et al. | 370/338 |
| 2003/0012168 A1* | 1/2003 | Elson et al. | 370/338 |
| 2003/0202512 A1* | 10/2003 | Kennedy | 370/389 |
| 2004/0032847 A1* | 2/2004 | Cain | 370/338 |
| 2004/0100929 A1 | 5/2004 | Garcia-Luna-Aceves | 370/338 |
| 2006/0098611 A1 | 5/2006 | Joshi et al. | 370/338 |
| 2006/0291485 A1 | 12/2006 | Thubert et al. | 370/401 |
| 2007/0127386 A1 | 6/2007 | Joshi et al. | 370/252 |
| 2008/0198865 A1 | 8/2008 | Rudnick et al. | 370/406 |

OTHER PUBLICATIONS

Lee et al., "*OLSR-MC: A Proactive Routing Protocol for Multi-Channel Wireless Ad-Hoc Networks,*" Wireless Communications and Networking Conference, Apr. 3, 2006, pp. 331-336.

Qu et al., "*Multi-Channel OLSR with a Dedicated Control Interface,*" International Symposium on Performance Evaluation of Computer and Telecommunications Systems, Aug. 2006, pp. 1-8.

\* cited by examiner

SYSTEM AND METHOD FOR COMMUNICATING OVER MESH NETWORKS WAVEFORM-ENHANCED, LINK-STATE ROUTING

RELATED APPLICATION

This application is a continuation of pending application Ser. No. 11/676,736 filed Feb. 20, 2007, the entire disclosure of which is hereby incorporated herein by reference.

FIELD OF THE INVENTION

The present invention relates to the field of communications, and more particularly, to communications over mesh networks.

BACKGROUND OF THE INVENTION

Mesh networking routes data, voice and instructions between nodes and allows for continuous connections and reconfiguration around blocked paths by "hopping" from one node to another node until a successful connection is established. Even if a node collapses, or a connection is bad, the mesh network still operates whether the network is wireless, wired and software interacted. This allows an inexpensive peer network node to supply back haul services to other nodes in the same network and extend the mesh network by sharing access to a higher cost network infrastructure.

Wireless mesh networking is implemented over a wireless local area network using wireless nodes. This type of mesh network is decentralized and often operates in an ad-hoc manner. The wireless nodes operate as repeaters and transmit data from nearby wireless nodes to other peers, forming a mesh network that can span large distances. In ad-hoc networking, neighbors find another route when a node is dropped. Nodes can be either fixed or mobile, with mobile devices forming a mobile ad-hoc network (MANET) known to those skilled in the art.

The mesh networks use dynamic routing capabilities. A routing algorithm ensures that data takes an appropriate and typically the shortest route to a destination. Some mobile mesh networks could include multiple fixed base stations with "cut through" high bandwidth terrestrial links operating as gateways to fixed base stations or other services, including the Internet. It is possible to extend the mesh network with only a minimal base station infrastructure. There are also many different types of routing protocols that can be used in a mesh network, for example, an Ad-hoc On-Demand Distance Vector (AODV), Dynamic Source Routing (DSR), Optimized Link State Routing protocol (OLSR) and Temporally-Ordered Routing Algorithm (TORR), as non-limiting examples. An example of a MANET using the OLSR protocol is disclosed in commonly assigned U.S. Pat. No. 7,027,409, the disclosure which is hereby incorporated by reference in its entirety.

A multi-hop, ad-hoc wireless data communications network transmits a packet among different intermediate nodes using multiple hops as it traverses the network from a source node to a destination node. In a TDMA mesh network, the channel time slot can be allocated before the node data is transmitted. The channel transmit time is typically allocated in a recurring slot. The channel time typically is segmented into blocks as an epoch and blocks are divided into slots used by nodes to transmit data. If the data is an isochronous stream, the data can be repeatedly generated and presented at the source node for delivery to a destination node. The data is time dependent and is delivered by a specified time.

OLSR is described in Request for Comment (RFC) 3626 by the Internet Society Network working group, the disclosure which is incorporated by reference in its entirety. OLSR is a protocol for a mobile ad-hoc network (MANET) that optimizes a classical link state algorithm for a mobile wireless LAN. It uses multipoint relays (MPR) to forward messages broadcast during a flooding process to reduce message overhead, as compared to a classical flooding mechanism, where every node retransmits each message when it receives the first copy of the message. The link state information is generated only by those nodes selected as a multipoint relay. Another optimization can be acquired by minimizing the number of control messages flooded in a network. Optimization can also occur when a MPR node discloses only links between itself and its MPR selectors. Thus, partial link state information can be distributed throughout the network and used for route calculation. Optimal routes in terms of the number of hops can be provided and are suitable for large and dense networks.

OLSR is table driven and exchanges topology information with other nodes regularly. The MPR are the nodes responsible for forwarding traffic distributed to the entire network. Thus, the MPR can reduce the number of required transmissions and operate as a more efficient mechanism throughout the network. OLSR can work in a distributed manner and does not depend on a central control. Each node can send control messages periodically and there can be some message loss. There is also no requirement for a sequenced delivery of messages.

OLSR and other link-state routing algorithms typically assume a single waveform (also known as physical layers or PHY) is used during their network topology and route discovery process. Different waveforms can have different ranges and potentially different data rate characteristics. It is possible that the network topology and routes discovered by the routing algorithms will be different when using different waveforms. That network topology and routes can vary with waveform is a problem.

OLSR proactively computes connection topology and multi-hop routes in a mobile, ad-hoc, wireless network by exchanging OTA message packets between network nodes. HELLO messages are exchanged among each node's local 1-hop neighbors. This allows the sensing of 1-hop neighborhood link states and the discovery of 1- and 2-hop neighbors. OLSR requires all links used for routing to be bidirectional. Topology control (TC) messages are flooded across a wireless network to disseminate the important parts of each node's neighborhood information (the MPR selector neighbors). OLSR is able to compute a network connectivity model and efficient routes from each node to any other node in the network for both directed and broadcast traffic.

OLSR implicitly assumes all HELLO and topology control over-the-air (OTA) message packets are transmitted using a single waveform or a set of waveforms having identical range (i.e., transmission distance or reach), and therefore, identical connectivity characteristics. The RFC 3626 OLSR standard is able to compute a coherent model of network connectivity.

When multiple waveforms having different range characteristics are used to transfer data in the network, the OLSR routing mechanism breaks down. This occurs because, in general, each different waveform will result in different network connectivity, i.e., which nodes can receive a particular node's transmissions when using that waveform. For example, if node X and node Y establish a link transmitting on waveforms A and B respectively, those waveforms are an intrinsic characteristic of the link. If node X sends a packet to node Y, but uses waveform C to transmit, the OLSR discovered link may not exist using waveform C, possibly due to range or interference differences between waveforms A and C.

SUMMARY OF THE INVENTION

A communication system includes a plurality of mobile nodes forming a mesh network. A plurality of wireless communication links connect the mobile nodes together. Each mobile node is formed as a communications device and operative for transmitting data packets wirelessly to other mobile nodes via the wireless communications link from a source mobile node through intermediate neighboring mobile nodes to a destination mobile node using a link state routing protocol and multiple waveforms.

Each mobile node can use multiple link state routing processes operating in parallel at a mobile node for each waveform. Separate HELLO and topology control messages can be transmitted and received per waveform.

A network conductivity model can be built at each mobile node for each waveform. A routing table can then be built at each mobile node for each waveform. Finally, the per-waveform routing tables can be merged into a single composite routing table based on routing criteria. These routing criteria can include minimum number of hops, minimum end-to-end latency, maximum data throughput, congestion avoidance, minimum power consumption, minimum bandwidth consumed, maximum throughput and dropped packets per route, among others.

Each mobile node can also use a single link state routing process for all waveforms by transmitting separate HELLO messages to 1-hop neighbors and flooding a separate set of topology control messages per waveform. A network topology table at each node can segregate link state information for each 1-hop neighbor by waveform. The 1-hop neighbor conductivity can also be predicted based on reception characteristics for a received packet on a single waveform. The reception characteristics can be formed as a received signal-to-noise ratio or similar measures. The link state routing protocol can be formed as an optimized link state routing (OLSR) protocol. Multiple waveforms can have different ranges.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
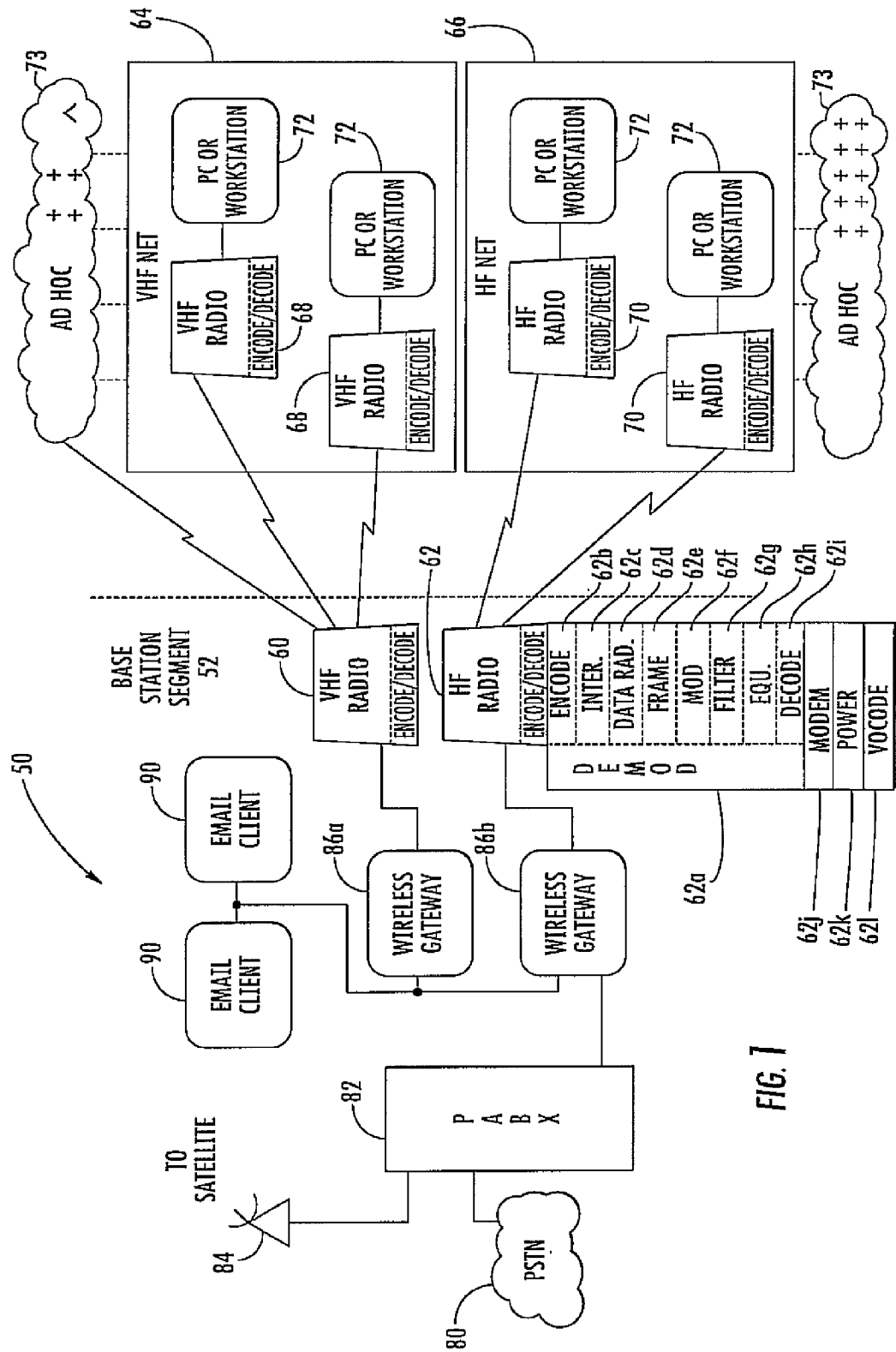
FIG. 1 is a block diagram of an example of a communications system that can be modified for use with the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

OLSR uses HELLO messages that have a 1-hop neighbor exchange. The 1-hop neighbors and link states are sensed and 2-hop neighbors are discovered. Topology control (TC) messages flood the network. MPR selector node 1-hop neighbors and the corresponding link states are disseminated. The OLSR algorithm at each node computes the network connectivity model and builds a route table.

In accordance with a non-limiting example of the present invention, it is desirable to use multiple waveforms having different ranges to support sometimes-conflicting goals. The number of hops are minimized, as are end-to-end latency, power consumption and bandwidth use. Data throughput and reliability are maximized. Standard link-state routing algorithms typically assume all link-state sensing, such as transmission of an over the air (OTA) packet, is performed using a single-range waveform. The typical OLSR algorithm does not handle multiple waveform ranges.

In accordance with the non-limiting example of the present invention, a separate OLSR process is run for each waveform. For example, separate HELLO and topology control messages can be used per waveform. Network connectivity models can be built for each waveform.

Each node builds a composite routing table from multiple OLSR process connectivity models. Whatever criteria are deemed important are optimized, including the number of hops, end-to-end latency, power consumption, bandwidth use, data throughput and reliability. Computational and bandwidth resources are consumed, but it is advantageous.

A single OLSR process can be used per waveform. Each node can send, for each waveform, a separate HELLO message containing 1-hop neighbors. From this each receiving node can collect 1- and 2-hop neighborhoods and 1-hop link states for each waveform. A separate topology control message can be flooded, per waveform, for the 1-hop MPR selector nodes and the corresponding link states. Receiver nodes can build a network connection model per waveform. Each node can then build a composite routing table optimizing criteria as indicated above.

One preferred solution uses a single OLSR process run in each node. This process can be modified to exchange a separate and independent set of 1-hop neighbor HELLO messages for each waveform. The HELLO message contains only 1-hop neighborhood information for that waveform. From this, each node can build a 2-hop neighborhood for each waveform. The OLSR state table can be extended to segregate link state information for each 1-hop neighbors by waveform. Further details are explained in the description.

Waveform connectivity inferences can be based upon a different waveform's measured link-state performance and connectivity. HELLO messaging can be used as in standard OLSR using a single waveform to transmit the HELLO messages. The link's reception characteristics can be collected, such as the signal to noise ratio. Heuristics can then infer other waveforms' link-state performance and connectivity though they have not been directly measured. In this way 1-hop link states and 1- and 2-hop neighborhoods can be generated from a single waveform's HELLO messaging. From each node a topology control message can be periodically flooded containing 1-hop MPR selector link state, either for all waveforms or only a single waveform. Network connectivity can be built per waveform and each node can then build a composite routing table.

It should be understood that by performing the inference at the node and collecting the link-state data, it is possible to make a better inference, but pay more in bandwidth to distribute the full set of partially synthesized link-state waveform data. By delaying any performance of the inference until after the measured link-state data has been distributed, it is possible to save some bandwidth by not distributing synthesized link-state data, but pay a potential cost of performing poor inference because it is not possible to use local feedback on previously inferred link metrics/state to guide the inference.

Separate routing tables can be built for multiple different-range radio waveforms and a single composite routing table can be built based on multiple optimization criteria in an ad-hoc, multi-hop, mobile wireless mesh network. For single OLSR processes and the waveform connectivity inferences, the system and method operates in channel-bandwidth-efficient fashion.

The system and method is advantageous to build multi-waveform routing tables with little additional bandwidth usage to allow competitive advantages for mobile wireless mesh ad-hoc networks.

An example of a communications system that can be used and modified for use with the present invention is now set forth with regard to FIG. 1.

An example of a radio that could be used with such system and method is a Falcon™ III radio manufactured and sold by Harris Corporation of Melbourne, Fla. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that could incorporate optical link state routing as modified in accordance with a non-limiting example, is described relative to a non-limiting example shown in FIG. 1. This high-level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. Ad-hoc communication networks 73 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 62a and appropriate convolutional encoder circuit 62b, block interleaves 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62*j*, and power adaptation circuit 62*k* as non-limiting examples. A vocoder circuit 62*l* can incorporate the decode and encode functions and a conversion unit which could be a combination of the various circuits as described or a separate circuit. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86*a*, 86*b*. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

There now follows a description of "bandwidth scavenging" followed by a more detailed explanation of the Quality of Service enhancements that address the end-to-end latency problems identified above. There then follows a description of the optimal link state routing as modified in accordance with a non-limiting example of the present invention. It should be understood that many of the mesh networks operate using a Time Division Multiple Access (TDMA) protocol. Depending on the configuration of a TDMA mesh network, a large portion or even a majority of configured bandwidth can be wasted. This can be true even when considering a maximum possible theoretical channel utilization.

TDMA mesh networks typically include a plurality of wireless nodes that communicate with each other using primary and secondary frequencies and using TDMA epochs that are divided into a beacon interval operative as a network control interval, sometimes a digital voice (DV) interval, and a digital data (DD) interval. For purposes of this description, TDMA mesh networks use a slot of channel time that is allocated prior to a node actually transmitting data during the allocated slot. Details of how the TDMA channel allocation mechanism works is not described in detail because it is sufficient that some algorithm is used to allocate a potentially recurring slot of channel time in which a particular node may transmit the data.

TDMA channel time allocation algorithms typically segment channel time into blocks. Each block is an epoch. Blocks are subdivided into slots used by nodes to transmit data. It is assumed that the data to be transmitted constitutes an isochronous stream, meaning that large portions of data are repeatedly generated and presented at the source node for delivery to the destination node. The data is typically time dependent, and must be delivered within certain time constraints. Multiple frequencies can be allocated to a single TDMA mesh network using a primary frequency and a plurality of secondary frequencies, sometimes up to four secondary frequencies in non-limiting examples.

Figure 2:
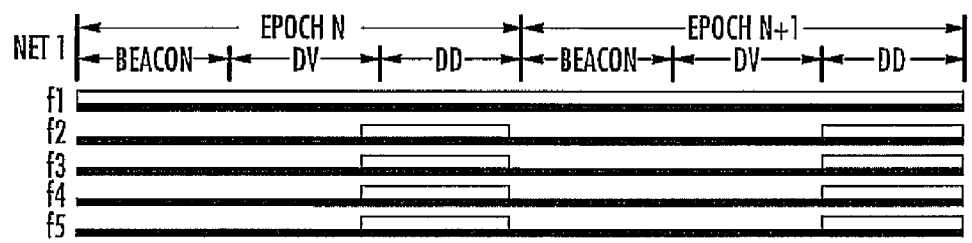
FIG. 2 is a graph showing the frequency use for a single TDMA mesh network.

As shown in FIG. 2 for a TDMA mesh network, only the digital data interval actually uses some of the secondary frequencies. All secondary frequencies during the beacon and digital voice intervals are unused. These unused portions of allocated frequencies can be referred to as wasted channel time, or more simply as channel wastage. Depending upon the relative sizes of the beacon, digital voice and digital data intervals, and how many secondary frequencies are allocated, a majority of allocated bandwidth can consist of channel wastage.

Of course, it is possible to configure TDMA mesh networks to minimize channel wastage. For example, a TDMA mesh network could be configured using only the primary frequency and no secondary frequencies, resulting in no channel wastage. Whenever any secondary frequencies are allocated, however, channel wastage occurs. Even in this case channel wastage can be minimized by maximizing the relative size of the digital data interval at the expense of any beacon and digital voice interval sizes. Unfortunately, there are practical constraints limiting how much channel wastage can be limited.

Beacon interval size is typically dictated by the number of nodes in the TDMA mesh network, for example, typically wireless nodes and often mobile or fixed nodes, as in a mobile ad-hoc network (MANET). More nodes mean a larger beacon interval. Digital voice or video interval size is dictated by the expected peak requirement for simultaneous digital voice and video services. These digital voice and video intervals can usually be reduced below an expected peak need at the cost of failing to provision the peak need at the likely cost of the digital voice or video failing to work exactly when it is most needed by the user in the field.

Figure 3:
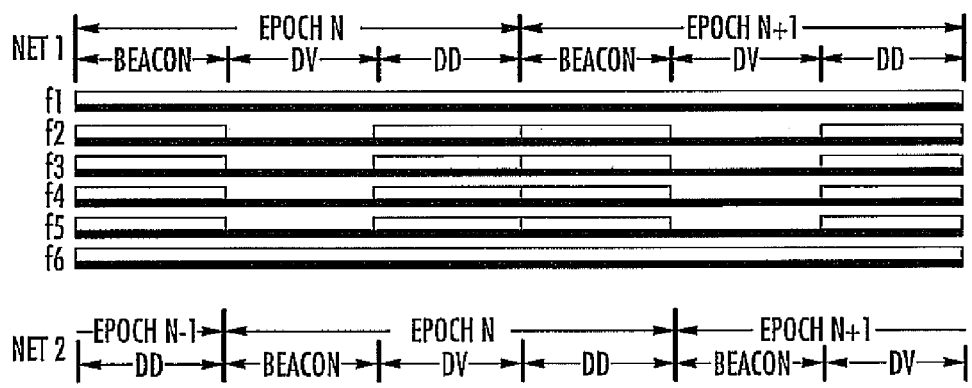
FIG. 3 is a graph similar to FIG. 1, but showing the frequency use overlap as "bandwidth scavenging" for two TDMA mesh networks, listed as Net 1 and Net 2.

The solution to channel wastage is achieved by recognizing that a second TDMA mesh network, for example, termed "Net 2" in FIG. 3, can use the unused TDMA portions of the first ("Net 1") TDMA mesh network's secondary frequencies, for its secondary frequency digital data usage. In effect, the system can scavenge a part of the secondary frequency channels unused by the first TDMA mesh network, thereby reducing channel wastage.

An example of the "bandwidth scavenging" as described is shown in FIG. 3. For example, a sixth frequency, f6, is allocated and used as the primary frequency for the second TDMA mesh network. Its start of epoch is offset from the start of epoch for the first TDMA mesh network, such that the digital data secondary frequency TDMA usage for the second TDMA mesh network falls in the unused parts of the secondary frequency usage map of the first TDMA mesh network. In this non-limiting example, channel wastage has been reduced by about 50%.

It should be understood that "bandwidth scavenging" as described requires several functions as follows:

1. Allocate a new, currently unused frequency for the second TDMA mesh network primary frequency;

2. Offset the start of epoch for the second TDMA mesh network from the start of epoch for the first TDMA mesh network so that the secondary frequency usage of the second TDMA mesh network falls in the unused portion of the secondary frequency usage map of the first TDMA mesh network; and 3. Maintain the start of epoch offsets during overlapping operation.

Allocating a new, currently unused frequency such as the primary frequency (number 1 above) can be done during the TDMA mesh network's initial configuration, or can be accomplished automatically via a configuration allowing automatic "bandwidth scavenging" in accordance with non-limiting examples of the present invention.

Establishing the initial start of epoch offset (number 2 above) can be accomplished with minimal steps. When a TDMA mesh network, e.g., the second TDMA mesh network, hears another mesh network, e.g., the first TDMA mesh network, with which it wishes to perform bandwidth scavenging, those radios or wireless nodes for the second TDMA mesh network that hear the radios or wireless nodes in the first TDMA mesh network create an artificial, or "phantom" radio or node, whose start of epoch is at the desired offset based upon the inferred start of epoch for the first TDMA mesh network. This "phantom" node is included in the second TDMA mesh network node's network synchronization algorithm, i.e., epoch synchronization, beacon synchronization or smoothing algorithm. The effect of including this "phantom" node is to gradually and systematically move the second TDMA mesh network's start of epoch to the desired offset. Other algorithms to establish the initial start of epoch offset are also possible.

Maintaining a start of epoch offset after the offset was first accomplished (number 2 listed above) also takes minimal steps. The "phantom" nodes in the network synchronization algorithm can be continued.

The "bandwidth scavenging" algorithm as described is flexible regardless of the configuration of the overlapping TDMA mesh network. This is because during the beacon interval only the primary frequency can be used by a TDMA mesh network. Thus, the beacon interval portion of the TDMA mesh network's secondary frequency map is usually available for use by other TDMA mesh networks. As a result, the "bandwidth scavenging" as described can be used, even when the overlapping TDMA mesh network's digital voice interval has been eliminated.

Extensions of this type of system are also possible. As part of its coexistence configuration, a TDMA mesh network can be configured to shift automatically to "bandwidth scavenging" as described when encountering another TDMA mesh network either to expand its effective bandwidth or to conserve the overall used bandwidth.

Figure 4:
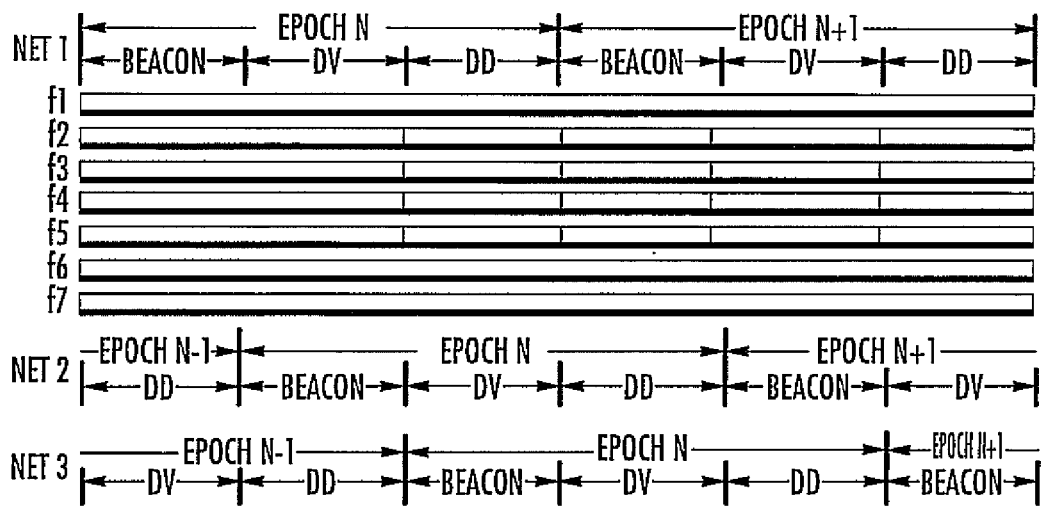
FIG. 4 is another graph showing the frequency use overlap as "bandwidth scavenging" for three TDMA mesh networks listed as Net 1, Net 2, and Net 3.

Another extension is to use bandwidth scavenging to overlap more than two TDMA mesh networks. An example of this for three TDMA mesh networks is shown in FIG. 4, which shows a chart similar to FIG. 3, but now showing a third TDMA mesh network, "Net 3," which is overlapped by allocating its primary frequency, f7, and aligning this third TDMA mesh network's start of epoch to allow its digital data secondary frequency usage to overlap or fall within the unused portions of the first and second TDMA mesh network's secondary frequency usage maps.

In some examples, the available unused secondary frequency gaps are too small to fit the alternate third TDMA mesh network's digital data interval. This is not a serious drawback, and possible alternative mechanisms can handle this situation.

"Bandwidth scavenging" as described is relevant to many RF communications devices. Multiple secondary frequencies can be used to extend total radio or wireless node bandwidth, and use the secondary frequencies during a digital data interval. As a result, these frequencies are wasted during digital voice, digital video, and during beacon intervals. "Bandwidth scavenging" as described allows any wasted parts of the secondary frequencies to be used when multiple TDMA mesh networks are present.

A TDMA type scheme can also be applied in a coarse-grained fashion to a TDMA mesh network radio frequency versus time usage characteristics to allow these TDMA mesh networks to "scavenge" the unused parts of each other's secondary frequencies, by offsetting in time each TDMA mesh network's secondary frequency usage with respect to the other(s). Bandwidth scavenging can be used in TDMA mesh networks to accomplish reuse of the otherwise wasted parts of wireless nodes or radio's secondary frequencies.

It should be understood that a TDMA mesh network architecture can be formed of different types, and a TDMA epoch in a non-limiting example as set forth comprises a network control interval as a beacon interval and digital data interval. A network control interval as a plurality of beacons uses only the primary frequency. The digital data interval uses both the primary and secondary frequencies via the TDMA channel allocation.

It is possible to reduce the requirements that any secondary frequency usage interdigitates, i.e., be non-overlapping. It should be understood that multiple TDMA mesh networks should be synchronized. Non-overlapping of secondary frequency usage, while desirable and optimal, is not strictly required. Thus, non-overlapping secondary frequency usage could be shown as an example of a more general inter-meshing network synchronization.

A "phantom node" synchronization algorithm can allow synchronization between and among multiple mobile, ad-hoc, and TDMA mesh networks. Moreover, there are several ways "bandwidth scavenging" could accomplish inter-network synchronization. Phantom node synchronization is just one.

A "phantom node" synchronization algorithm achieves and maintains synchronization between and among multiple mobile, ad-hoc, mesh networks independent from "bandwidth scavenging" as described above in accordance with non-limiting examples of the present invention. As such, this type of "phantom node" synchronization algorithm can be useful not just for "bandwidth scavenging" inter-meshed TDMA mesh network synchronization, but also useful when multiple mesh networks should be synchronized for other reasons, e.g., to simplify the job of gateway nodes or simplify the coexistence and interoperability of multiple TDMA mesh networks on the same frequency in the same place.

One non-limiting example is a gateway between two high performance TDMA mesh networks that typically communicates using a TDMA epoch that has a beacon interval, digital voice interval, and digital data interval. The gateway node could be a member of both TDMA mesh networks. The gateway node should transmit two beacons, one for each of the two TDMA mesh networks. If the two TDMA mesh networks are not synchronized, however, problems could arise. For example, sometimes the beacon transmit times for the two beacon transmissions will overlap. Because it is unattractive cost-wise to include two independent radios in the gateway node, typically a wireless node, the gateway node will be able to transmit one of the two beacons. Moreover, even if the gateway did have two independent radios in the one node, when both TDMA mesh networks are operating on the same frequency, only a single beacon would be transmitted at a time. Otherwise, a collision would occur with the result that no node would correctly receive either beacon. With the two overlapping TDMA mesh networks having the same epoch duration, or an integer multiple thereof, it could be synchronized for simplifying the gateway node's operation. This inter-network gateway functionality is an example of interoperability.

Coexistence is another example when the system might want to synchronize the operation of multiple TDMA mesh networks. It is desirable for the beacon interval of each TDMA mesh network to fall within the digital data interval, and in some networks, the digital voice and/or digital data interval of the co-located TDMA mesh networks, so that each TDMA mesh network's beacon transmissions would not collide with those of the other TDMA mesh networks. A TDMA mesh network could make an artificial reservation during a digital data interval corresponding to the other TDMA mesh networks beacon interval. As a result, two TDMA mesh networks prevent any of their nodes from making digital data transmissions or beacon transmissions that would collide with the other TDMA mesh networks' beacon transmissions. For a TDMA mesh network to continue to function reliably and robustly, many of its beacon transmissions must be correctly received by neighboring nodes in the TDMA mesh network. In this case, synchronization is needed such that these "artificial" TDMA channel reservations are stationary with respect to the other TDMA mesh networks' beacon intervals.

"Phantom node synchronization" is a simple and robust technique to achieve synchronization and maintain synchronization between potentially multiple TDMA mesh networks, completely independent of the reasons why the synchronization is desired.

The problem of minimizing end-to-end latency can also be addressed. In this description, quality of service can typify the deliver of real-time data and the problem of minimizing end-to-end latency is addressed, particularly in a multi-hop ad-hoc wireless network. It should be understood that the time taken by over-the-air (OTA) headers, inter-frame spaces, cyclic redundancy checks (CRC), trailers, stuff bits, and the like are typically treated as part of the OTA transmission time.

Quality of Service (QoS) parameters are optimized when delivering real-time data across a data communications network, and typically include end-to-end latency, jitter, throughput and reliability. The description as follows focuses on end-to-end latency.

End-to-end latency can be defined as the time it takes to deliver a data packet from a source node to a destination node. End-to-end latency can also be defined as the time duration from when the data packet is presented to the data communications layer of the stack at the source node, to when the data packet is passed up from the data communication layer of the stack at the destination node. End-to-end jitter can be defined as the variance of end-to-end latency, sometimes expressed as the standard deviation of latency.

In a multi-hop, ad-hoc, wireless data communications network, a packet will, in general, be transmitted multiple times, i.e., take multiple hops, as it traverses the network from the source node to the destination node. For purposes of this description, TDMA mesh networks use a slot of channel time that is allocated prior to a node actually transmitting data during the allocated slot. Details of how the TDMA channel allocation mechanism works are not described in detail because it is sufficient that some algorithm is used to allocate a recurring slot of channel time in which a particular node may transmit the data. TDMA channel time allocation algorithms typically segment channel time into blocks. Each block is an epoch. Blocks are subdivided into slots used by nodes to transmit data. It is assumed that the data to be transmitted constitutes an isochronous stream, meaning that large portions of data are repeatedly generated and presented at the source node for delivery to the destination node. The data is typically time dependent, and must be delivered within certain time constraints.

When a data packet traverses the TDMA mesh network from a source node to a destination node, it will be transmitted by some sequence of nodes. For example, this sequence consists of nodes A, B, C, and D to destination node E, where node A is the source node. For example purposes, the system assumes each transmitted data packet is successfully received by each hop's destination node.

Figure 5:
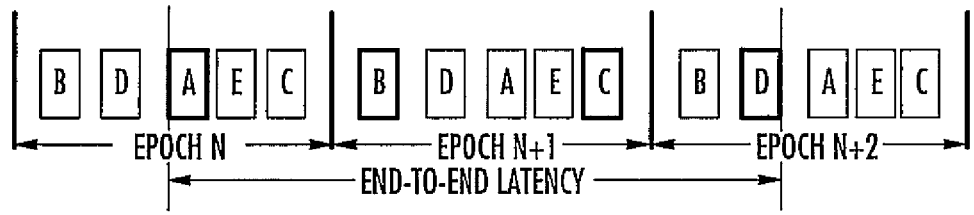
FIG. 5 is a chart showing non-express, Quality of Service (QOS) TDMA channel allocation, and showing how a data packet can travel from a source node A to a destination node E when transmitted by nodes and crossing the TDMA network.

FIG. 5 is a timing chart illustrating how a particular data packet may travel from source node A to destination node E when transmitted by each node crossing the TDMA mesh network based upon a non-express-QoS (Quality of Service) TDMA channel allocation algorithm. Each node carrying the isochronous data stream across the TDMA mesh network has been granted a slot by the TDMA algorithm that repeats in each TDMA epoch. During TDMA epoch N, source node A transmits the data packet to node B during the first TDMA epoch. Next, during TDMA epoch N+1, node B transmits the data packet to node C, and node C transmits it to node D. Finally, during TDMA epoch N+2, node D transmits the data packet to node E, the final destination. The end-to-end over-the-air (OTA) latency for the data packet's traversal is just under two TDMA epochs. OTA latency includes neither stack processing time, the time to travel up/down the stack within the source and destination nodes, nor the time the data packet waits in the queue at the source node for arrival of the source node's allocated transmission time, which is shown as the first 'A' channel time allocation in TDMA epoch N in FIGS. 5 and 6.

Figure 6:
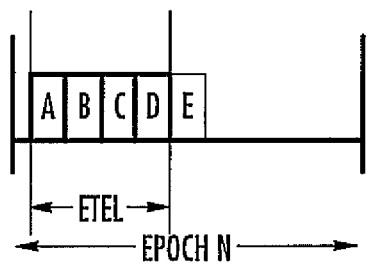
FIG. 6 is a chart showing an express Quality of Service and End-to-End Latency (ETEL).

The bold-lined portions in FIGS. 5 and 6 represent data packets transmitted over-the-air (OTA). No data packet is transmitted in "the slot" for node E. The slot is present to show that node E exists. It could be considered an "imaginary" slot. This is where node E may transmit if it were to transmit an OTA data packet if it were not a destination node. Because node E can be a distraction node, it only receives packets in this example and never transmits a data packet.

The system analyzes hop latencies that fit together along the route traversed, with the express Quality of Service (QoS) algorithm as described to reduce end-to-end latency. End-to-end OTA route traversal latency can be substantially reduced by modifying the TDMA channel time allocation algorithm to order the transmission allocation to each node participating in the data stream's route within each TDMA epoch as shown in FIG. 6.

Minimum end-to-end latency can be achieved when the next-hop's TxOp (transmission opportunity) for the data stream whose latency the system is trying to minimize occurs as soon as possible after the QoS data packet to be relayed is received, ideally at the data slot following reception. When viewed as a sequence of TxOps, the optimal QoS TxOp sequence consists of a series of adjacent time-sequential TxOps in the epoch, from the source node to destination node, one TxOp for each hop. By paying attention to how hop latencies fit together, and then optimally ordering the resulting sequence of channel time allocations within the epoch, the end-to-end latency shown in FIG. 6 is reduced to less than half an epoch.

To achieve minimal OTA end-to-end latency, the Express QoS allocation algorithm can order each node's recurring transmission time within the epoch in route-traversal sequence, i.e., sequentially in the epoch data interval from a source node to a destination node. This provides the majority of end-to-end OTA latency reduction.

In addition, the Express QoS allocation algorithm can place each allocation in the route sequence as close as possible to its neighboring allocations in the route sequence. Though not as important as the ordering of allocated slots, this provides some additional reduction in end-to-end OTA latency and allows longer routes to fit within single epoch.

For Express QoS to be able to reduce end-to-end latency, sufficient channel time, i.e., slots, should be available and unallocated such that Express QoS has a choice of allocations at multiple nodes along the route. The more slot choices Express QoS has available, the more it can minimize end-to-end latency.

The Express QoS allocation algorithm can coordinate local node channel time allocation across the spatial extent of the source-to-destination traversal route. This requires some inter-node communication. Typically, communication between adjacent nodes is required and communication beyond adjacent neighbors along the route is not required.

It should be understood that full duplex operation in wireless TDMA mesh networks is typically achieved by creating two data streams, one stream for each direction of travel. Express QoS as described requires a different ordering of channel allocations for each direction, since an optimal slot allocation sequence in one direction will be a worst-case allocation for the opposite direction.

Express QoS as described can substantially reduce the latency experienced by packets belonging to a QoS data stream flowing across a wireless TDMA "multi-hop" mesh network. This improved QoS latency as described is applicable to demanding QoS-sensitive applications, such as two-way real-time voice.

To quantify and characterize the latency improvement that can be expected, consider the expected latency of a packet traveling across a wireless TDMA mesh network of diameter "D" from one edge of the network to the opposite edge. In all cases at each hop the placement of the transmission slot within the TDMA epoch's digital data interval is entirely dependent upon the details of the operation of the TDMA channel allocation algorithm. Many algorithms are possible. Unless the algorithm explicitly optimizes relative slot positions along the route so as to minimize the latency experienced by packets traversing that route, however, there is no reason to expect the data packets will achieve an "average" per-hop traversal latency of less than the approximate 0.5 TDMA epochs expected by random slot placement. Using the Express QoS TDMA channel allocation algorithm as described, however, per-hop traversal latency as low as the OTA data transmission time can be achieved provided all allocation can be fit within a single epoch. As shown in FIG. 6, using Express QoS as described, a data packet can traverse the entire route in less than a single epoch.

Express QOS is an extension of the TDMA channel allocation algorithm to minimize end-to-end latency along a route across a multi-hop TDMA mesh network, adding a latency-minimizing extension to the TDMA algorithm.

There are other possible extensions. For example, when nodes move, established pre-existing routes can change. Because the express QOS TDMA channel time allocations are route-dependent, when nodes move and routes change, the express QOS channel time allocation algorithm/mechanism must revisit and refigure-out what is the best, i.e., the lowest latency, allocations and make changes in the pre-existing allocations accordingly. This refiguring-out could be triggered by detecting changes in a route or be accomplished periodically with the re-do frequency based on a metric for how rapidly the relevant parts or overall network typology changes.

It is also possible to consider what happens when a new express QOS allocation request is made while previous requests are still active. When this happens, it is likely to be beneficial to revisit previously granted request, i.e., the allocations previously made, in order to optimize the efficiency of the allocations considered as a whole, i.e., minimize the latency across all active express quality of service streams, both old and new.

In accordance with the non-limiting example of the present invention, the network topology and route discovery routing algorithms across multiple waveforms can have different ranges and potentially different data rates and characteristics.

For purposes of description, an analysis of the OLSR protocol is first described followed by details of the system and method in accordance with non-limiting aspects of the present invention.

OLSR is a protocol that connects mobile ad-hoc networks (MANETs) also termed wireless mesh networks. It is a link-state routing protocol that calculates a optimized routing table based upon collected data about available connectivity. OLSR uses HELLO messages to find a node's 1-hop and its 2-hop neighbors through responses from 1-hop neighbors. A node can select MPR (Multi-Point Relay) based on the 1-hop nodes that offer superior coverage of its 2-hop neighbors. Each node can have a multipoint relay selector set consisting of its 1-hop neighbors that have selected it as their MPR. MPR efficiently forward broadcast messages during the flooding process, thus reducing flooding overhead. Link-state information is flooded by those nodes elected as MPR. OLSR is a table driven protocol that exchanges topology information with other nodes on the network regularly. In an OLSR system, a node is typically a MANET router that implements the OLSR routing protocol. An OLSR interface is typically a network device that participates in a MANET running OLSR. One node can have several OLSR interfaces with each assigned a unique IP address. A non-OLSR interface could be a network device not participating in a MANET running OLSR. A single OLSR interface node could be a node that has a single OLSR interface participating in an OLSR routing domain. A multiple OLSR interface node could be a node having multiple OLSR interfaces.

A node can have a main address as an "originator address" of messages emitted by the node. For example, the node X could be a neighbor node of node Y, if node Y can hear node X such as when a link exists between an OLSR interface on node X and an OLSR interface on node Y. A node heard by a neighbor can be a 2-hop neighbor. A multipoint relay (MPR) could be the node that is selected by its 1-hop neighbor, node X, to "retransmit" the broadcast messages as long as the message is not a duplicate. A multipoint relay selector could be the node that selected its 1-hop neighbor as multipoint relay. A link could be a pair of OLSR interfaces from two different nodes that are susceptible to hear each other. A symmetric link could be a bidirectional link between two OLSR interfaces and an asymmetric link could be a link between two OLSR interfaces verified in one direction. A symmetric 1-hop neighborhood of any node X is a set of nodes having at least one symmetric link to X. A symmetric 2-hop neighborhood would be the 2-hop neighborhood of X that excludes X itself.

OLSR is suited to large and dense mobile networks using hop-by-hop routing such that each node uses its local information to route packets.

OSLR can minimize the overhead from flooding of control traffic by using only MPR to retransmit control messages. This reduces the number of retransmissions required to flood a message to all nodes in the network. A partial link state would only be required to be flooded to provide a shortest path route. OLSR works in a distributed manner and each node can send control messages periodically and sustain some loss of messages. There is no requirement for sequenced delivery of messages. Each control message can contain a sequence number that is incremented for each message. Thus, a recipient of a control message can identify that information that is more recent, even if some messages have been reordered in transmission. There is some support for a sleep mode operation and multicast-routing for different protocol extensions.

Multipoint relays can minimize the overhead of flooding messages by reducing redundant transmissions. Each node would select a set of nodes in its symmetric 1-hop neighborhood to retransmit the messages. Thus, the selected neighbor nodes can be termed the "multipoint relay" (MPR) set of the node.

Figure 7:
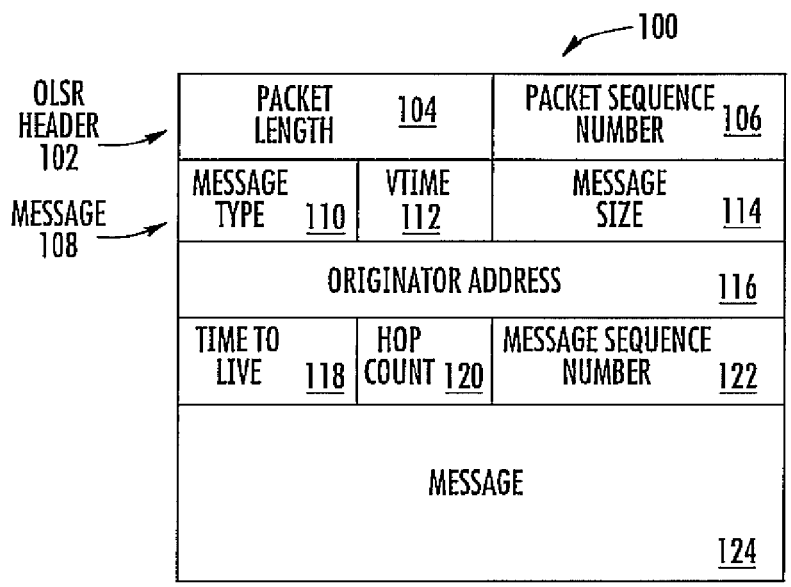
FIG. 7 is a block diagram showing a format of a representative example of an OLSR packet.
Figure 8:
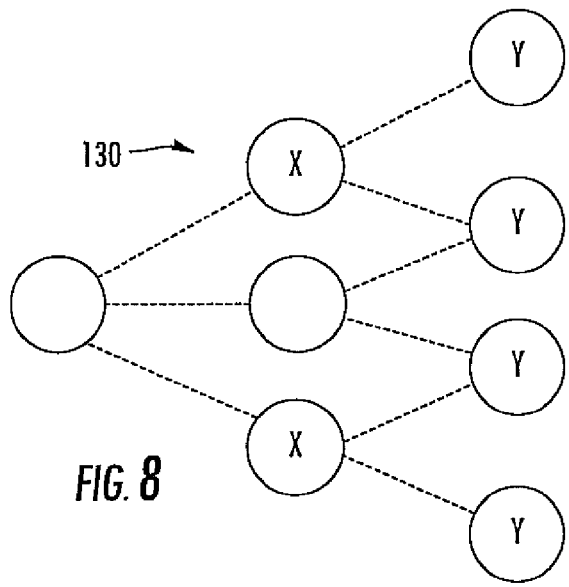
FIG. 8 is a high-level sequence diagram showing a multipoint relay selection.
Figure 9:
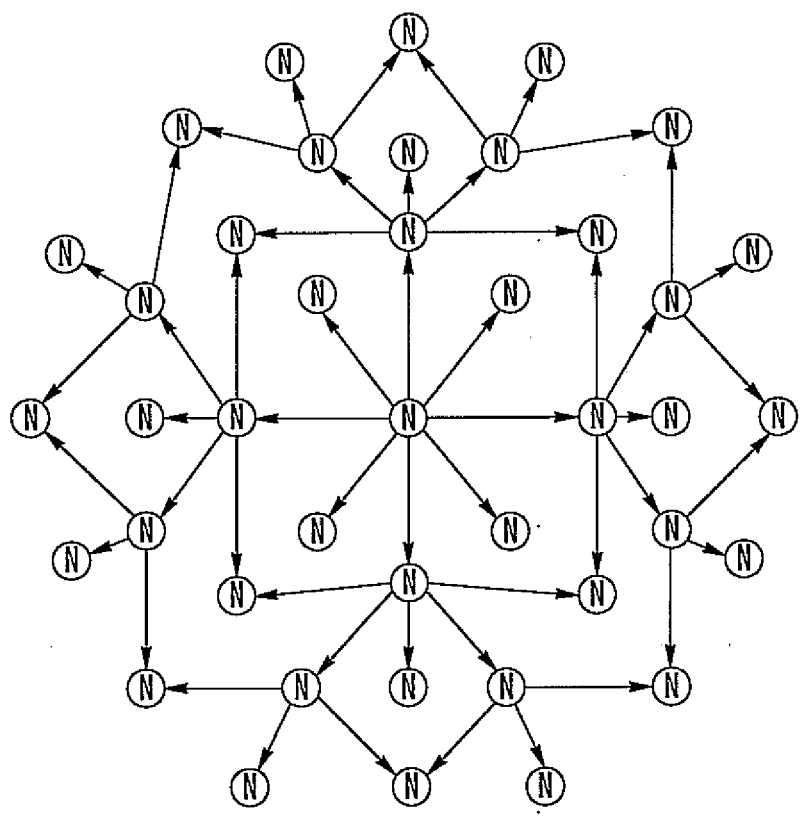
FIG. 9 is a high-level diagram showing an example of multipoint relaying for MPR flooding.

Referring now to FIGS. 7-9, there follows a basic description of the OLSR algorithm. It should be understood that OLSR is a pro-active routing protocol such that routes can be set up based on continuous control traffic and all routes can be maintained all the time. The OLSR protocol can have neighbor/link sensing, optimized flooding and forwarding with multipoint relaying and link-state messaging and route calculation.

FIG. 7 is a block diagram of an example of an OLSR packet format shown at 100. The OLSR header 102 includes a packet length indicator 104 and packet sequence number 106 followed by a message portion 108 that would include a message type indicator 110, VTIME 112, message size 114, originator address 116, a Time to Live data 118, hop count 120 and message sequence number 122 followed by the message 124.

The neighbors and links are detected by HELLO messages and all nodes can transmit HELLO messages on a given interval. The HELLO could be asymmetric and symmetric. Multipoint relaying is used to reduce the number of duplicate retransmissions while forwarding a flooded packet. Multipoint relaying restricts the set of nodes retransmitting a packet for flooding to a subset of all nodes. The size of the subset depends on the topology of the network.

FIG. B shows a multipoint relay sequence at 130 in which nodes can select and maintain an MPR. The MPR labeled X for a 2-hop neighbor Y is such that Y can be contacted via X. The nodes register and maintain MPR selectors, and if an OLSR packet is received from an MPR selector, messages contained in that packet are forwarded for known and unknown message types if TTL is greater than zero. FIG. 9 shows an example of flooding with multipoint relaying with different nodes shown by the circles indicated with the letter "n".

OLSR can have a modular design with a scheduler that runs in the thread. An OLSR daemon can include a socket parser with registered sockets and an OLSR packet parser that has parse functions. The different tables are information repositories and can include duplicate tables with a scheduler. It is possible to have plug-ins as dynamically loaded libraries (DLLS) as code that can be linked and loaded. OLSR MPR flooding can be used for net-wide broadcasts.

OLSR's network connectivity, topology and route computations can be extended to handle multiple waveforms having different ranges and potentially different data rates.

It is possible to use multiple OLSR processes. OLSR can be adapted to handle multiple waveforms having different radio ranges. This can be accomplished by running a separate OLSR process in each node for each of the waveforms. Each OLSR process performs its own independent set of HELLO and Transmit Control (TC) message transmissions using a different waveform. Each OLSR process builds a model of network connectivity, based on its waveform's range, in the usual OLSR fashion. Then each OLSR process constructs a routing table for its waveform's connectivity. Finally, a single composite routing table is built at each node from the collection of waveform routing tables.

It is possible to construct a variety of composite routing tables depending upon what routing criteria or combination of criteria are being optimized. Possible routing criteria to be optimized include combinations of the following:
- minimum number of hops;
- minimum end-to-end latency;
- maximum data throughput;
- congestion avoidance;
- minimum power consumption;
- highest reliability, i.e., fewest dropped packets; and
- minimum bandwidth used.

This system and method could be expensive in terms of both the OTA (over the air) bandwidth consumed, and computationally (which translates into reduced battery lifetime, increased memory usage, and increased processor time usage).

It is possible to use a single OLSR process that reduces both bandwidth and computational expense.

Instead of running a parallel OLSR process in each node for each waveform, a single OLSR process is run in each node. This single OLSR process is modified to exchange a separate and independent set of 1-hop-neighbor HELLO messages for each waveform. The HELLO message exchanges 1-hop neighborhood information for that waveform. Each node can build a 2-hop neighborhood for each waveform.

The OLSR state table is extended to segregate link state information for each of the 1-hop neighbors by waveform. Each node's 1-hop neighborhood for each waveform is distributed in a single transmit control message. This provides each node the information it requires to build its network topology model of connectivity for each waveform. From this multi-waveform network topology, each node builds its own composite route table.

This improvement merges the multiple OLSR processes into a single OLSR process, while keeping independent HELLO messaging for each waveform. Instead of each MPR transmitting separate TC messages for each waveform, every waveform's link states are included in a single transmit control message. Bandwidth consumed is significantly reduced, along with the computational and memory burdens of a separate OLSR process per waveform and processing of separate transmit control message streams for each waveform.

In another aspect of the present invention, it is possible to use a waveform connectivity inference such that OLSR messages are transmitted using a "base" waveform. The base waveform may or may not be the longest-range waveform. The base waveform will typically be one of the longer-range waveforms because a shorter-range waveform may not reach all nodes reachable by longer-ranged waveforms. Record reception characteristics can occur for each received OLSR packet on the base waveform. It is possible to use heuristics based upon OLSR packet reception characteristics and previously characterized relative waveform performance to predict each node's 1-hop neighborhood connectivity for each non-base waveform.

Possible extensions and improvements include using non-HELLO messages to collect link-state information and statistics. For example, in some radio network beacons, data and any other message sent can be used to characterize the link base upon the particular waveforms used to transmit the packet and dynamically improve or adapt the heuristic used to predict conductivity for other waveforms.

A good condition for the heuristic used to predict each waveform's 1-hop neighbourhood/connectivity is the received signal-to-noise ratio, S/N. Additional link parameter information such as fading and delay spread and/or laboratory and field measurements can be collected and used. It may be useful to supplement the OLSR traffic reception parameter information with that of data traffic and other control traffic. It may also be useful to transmit some amount of "extra" OLSR traffic to estimate correct reception for other waveforms sufficiently well to be able to correctly populate each waveform's 2-hop neighbourhood. This all depends on the particulars of the waveforms.

From this point onward, the process is similar to that of the single OLSR process described above, except that in the waveform connectivity inference, predicted instead of measured 1-hop neighborhoods are used for all but the base waveform. MPR link-state and connectivity for each waveform is distributed in a single topology control message. This provides each node the information it requires to build its network topology model of connectivity for each waveform. From this multi-waveform network topology, each node builds its own composite route table.

An alternate approach is to apply the heuristic (perform the link-reception-characteristics-to-1-hop-neighbor translation) after receiving each MPR's topology control message instead of before an MPR's topology control message is generated. Essentially, this pushes application of the heuristic from the source of the topology control message to the destination of the topology control message. It also means the reception characteristics of each received OLSR packet must be collected on a per-1-hop-neighbor basis and distributed in topology control messages. Overall, it is probably simplest to apply the heuristic at the source.

The system is operable by approximately predicting each non-base waveform's 1-hop connectivity, i.e., the probability that a transmission will be successfully received, given the 1-hop connectivity and reception characteristics of the base waveform. A signal-to-noise based heuristic may accomplish this inference, but other heuristics that work can be used.

In one non-limiting aspect, a waveform connectivity inference is an improvement over single OLSR process and multiple OLSR processes solutions. A waveform connectivity inference typically transmits the same number of OTA OLSR packets as does traditional OLSR because it is using only a single base waveform. It is also possible to sample some subset of the waveforms beyond just the base waveform. It provides a spectrum of alternatives ranging from sampling such as the HELLO messages only on the base waveform and up to sampling all the waveforms. For example, it is possible depending upon the details of the particular waveforms involved, that sampling could occur for a few of the waveforms because of the particular relationship between the waveforms and predict the remaining waveforms.

Multiple OLSR processes, on the other hand, transmit a separate set of HELLO and topology control messages for each waveform to be supported. For example, a single OLSR process transmits a separate set of HELLO messages for each waveform to be supported. This partially multiplies the number of OLSR HELLO and transmit control OTA packets by the number of waveforms supported for a single OLSR process and multiple OLSR processes. The large decrease in channel bandwidth used by the waveform connectivity inference is a significant benefit as compared to the bandwidth used by multiple OLSR processes or a single OLSR process sampling all waveforms using HELLO messages. A waveform connectivity inference leaves more channel bandwidth to transport user data, as compared to a multiple OLSR processes and a single OLSR process.

Waveform Connectivity Inference topology control messages contain more information than standard messages. A waveform connectivity inference topology control message contains, in addition to the source node's base waveform's MPR selector set, either a separate MPR selector set for each additional waveform or the reception characteristics for each MPR selector set link for each waveform. The waveform connectivity inference topology control message payload may overflow the link and/or PHY MTU (maximum transmission unit), thus necessitating transmission of a second OTA packet to complete the waveform connectivity inference OTA message. When and whether this happens will depend upon both the MTU of the link/PHY and the size of the network. The size of the network comes into play because topology control messages are flooded and multiple messages may be forwarded together in a single OTA packet.

OLSR typically transmits OTA HELLO messages every two seconds and OTA topology control messages every five seconds. When a HELLO OTA message transmit time coincides with a topology control OTA message transmit time, the two messages can be placed into a single OTA packet, provided there is no overflow of the link and/or PHY MTU. Likewise, the multiple OTA topology control messages originally generated by different multiple OLSR processes can be merged into a single OTA packet when they are forwarded during flooding. This somewhat mitigates the proliferation of OTA messages generated by a single OLSR process and multiple OLSR processes.

A single OLSR process and multiple OLSR processes, however, transmit a separate OTA HELLO message packet for each waveform so that the recipient can collect the packet's reception characteristics for that waveform—they must explicitly sample every waveform. The waveform connectivity inference solution, on the other hand, explicitly samples only a single or small number of waveforms. Thus, the waveform connectivity inference solution will transmit substantially fewer OTA messages than a single OLSR process and multiple OLSR processes.

Since the heuristic, of necessity, makes its predictions based on incomplete input data, its predictions will generally include some degree of error. Because routing errors are expensive (from the user's point of view), it is sensible to use a conservative heuristic to have a high degree of confidence that when the heuristic predicts a symmetric connection exists, that the symmetric connection does, in fact, exist. In some examples, the system may fail to predict symmetric links when they do, in fact, exist. The better the heuristic, the more this "conservatism" cost can be minimized, but it will always be present to some degree.

The amount of memory required for the single OLSR process, multiple OLSR processes, and waveform connectivity inference solutions is greater than that required by traditional OLSR using only a single waveform. This is due to the necessity of including either a 1-hop neighborhood per node per waveform, or 1-hop reception characteristics per node per waveform, in each node's OLSR state table. Additional memory and cycles are used in the construction of a two-dimensional network connectivity topology table where the waveform is the second dimension instead of the one-dimensional network connectivity topology table maintained by a traditional OLSR.

It should be understood that the single OLSR process, multiple OLSR processes, and waveform connectivity inference approaches can be applied to any link-state-based routing algorithm. It is more generally applicable than just OLSR.

Having the full connectivity matrix, for each waveform range available, facilitates optimizing the composite routing table based upon multiple criteria. The idea of constructing a composite routing table from multiple connectivity matrices (one for each waveform) may be novel.

In addition, it may be desirable to construct and maintain multiple different composite routing tables for different purposes and/or different kinds of traffic, e.g., one composite routing table for QoS (quality of service) traffic, minimizing end-to-end latency given various other constraints, such as a specified throughput and reliability. Another composite routing table can be optimized for minimum power consumption for best-effort traffic. Optimizing additional composite routing tables for other criteria is also possible.

Standard OLSR only uses link state information gathered via HELLO messages, i.e., OLSR's neighborhood probing control messaging intended to assess link state. Every time a transmission-reception event occurs, such as transmission of data, beacon, OLSR control messages or other OTA packets, the opportunity to collect link state quality information for the transmission waveform exists. Rather than just ignoring or discarding the link information from these non-OLSR-HELLO receptions, link characteristics for every reception should be collected. Likewise, the fact that a particular transmission failed to be received is also useful information characterizing a link and should be incorporated into the heuristic. When the base waveform is used for transmission, the reception characteristics are used to augment the link state assessment provided by OLSR HELLO messaging.

In the case of a waveform connectivity inference, the measured link characteristics at the receiver for transmissions using non-base waveforms can be used in two different ways. First, they can be used to provide a measured assessment of link quality to augment the link quality predicted by the heuristic and be distributed in transmit control messages. Second, when measured non-base waveform connectivity differs from predicted connectivity, the measured connectivity can be used to dynamically calibrate the prediction heuristic.

For a variety of reasons, non-base-waveform connectivity predicted by the heuristic may be in error to a greater or lesser degree. Moreover, the optimal heuristic may not be static. It may change over time.

To improve non-base-waveform predictions, i.e., tune the heuristic, and to minimize the waveform connectivity inference "conservatism" cost as described above, the link characteristics of non-OLSR transmissions can be collected and used to provide feedback to the heuristic. For example, non-base-waveform receptions can be compared against the reception predicted by the heuristic and used to tune the heuristic to improve future predictions. This might be described as a "passive collection" of heuristic-tuning data. Non-base waveform data can be collected when a non-base waveform is used for a transmission.

Another approach intentionally varies the transmission waveform used, among the non-base waveform set, to maximize the amount of useful, heuristic-tuning data collected. This might be described as "active collection" of, or "probing" for, heuristic-tuning data. Essentially, the system actively probes the local 1-hop connectivity among non-base waveforms in order to improve the performance of the heuristic. Data is transmitted that needs to be transmitted anyway. The waveform used for these transmissions is varied to maximize the amount of heuristic-improving information collected. Thus, little bandwidth usage cost is involved.

Typically, there would be little bandwidth cost involved except if a lower-speed waveform is used to probe. It will take more channel time to transmit the OTA packet at the lower data rate, and thus, more bandwidth is used. If probing is used, the use of the higher-data-rate, shorter-range waveform imparts a greater probability that the packet will be received incorrectly, as compared to using a lower-data-rate longer-range waveform. Thus, the system may suffer the cost of either dropping the packet, for best-effort type of service, or having to retransmit the packet for reliable service, and therefore, end up using more channel time, and thus more bandwidth.

A waveform connectivity inference extends the standard OLSR routing algorithm to handle multiple waveforms, each having different radio-range characteristics, to produce a two-dimensional routing table across the dimensions of MAC destination address and waveform. It does this with minimal increase in channel bandwidth use.

The ability to generate full routing tables and next-hop relay tables with little additional bandwidth usage when a plurality of different-ranged waveforms is in use is a significant advantage for any wireless mesh ad-hoc network.

Each option extends the standard OLSR (or other link-state) routing algorithm to handle routing when multiple waveforms having different radio-range characteristics are available. The system has the ability to build separate routing tables for multiple different-ranged radio waveforms, and a single composite routing table based upon multiple optimization criteria, and in the case of a waveform connectivity inference system, to do so in a channel-bandwidth-efficient fashion.

Figure 10:
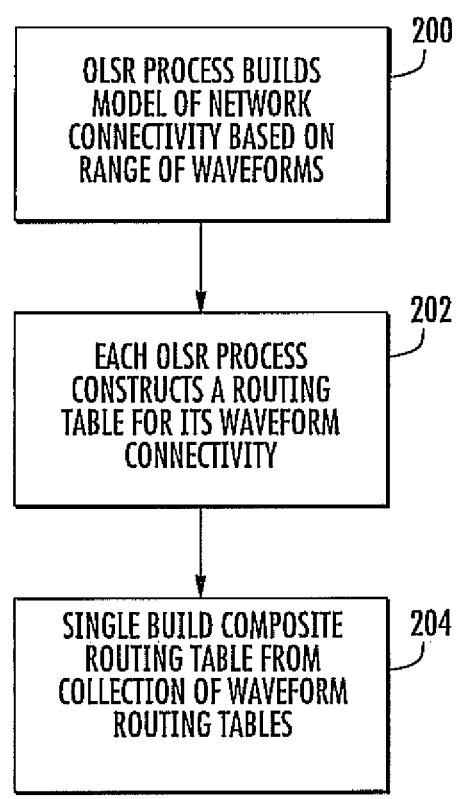
FIG. 10 is a high-level flowchart illustrating a basic process used in waveform-enhanced, link-state routing for a multiple OLSR processes in accordance with a non-limiting example of the present invention.

FIG. 10 illustrates a flowchart showing the multiple OLSR processes. Each OLSR process can perform its own independent set of HELLO message transmission using a different waveform. Each OLSR process can flood either a single (periodic) topology control message for each waveform. Alternately, each OLSR process can flood a single (periodic) topology control message containing topology information for all waveforms. The latter is more bandwidth efficient and thus is to be preferred. As shown in block 200, each OLSR process builds a model of network conductivity based on a range of waveforms in the usual OLSR fashion.

Each OLSR process constructs a routing table for its waveform connectivity (block 202). A composite routing table is built from the collection of individual waveform routing tables based on routing criteria such as the minimum number of hops; minimum end-to-end latency; maximum data throughput; congestion avoidance; minimum power consumption; highest reliability (fewest dropped packets) and minimum bandwidth used (block 204).

Figure 11:
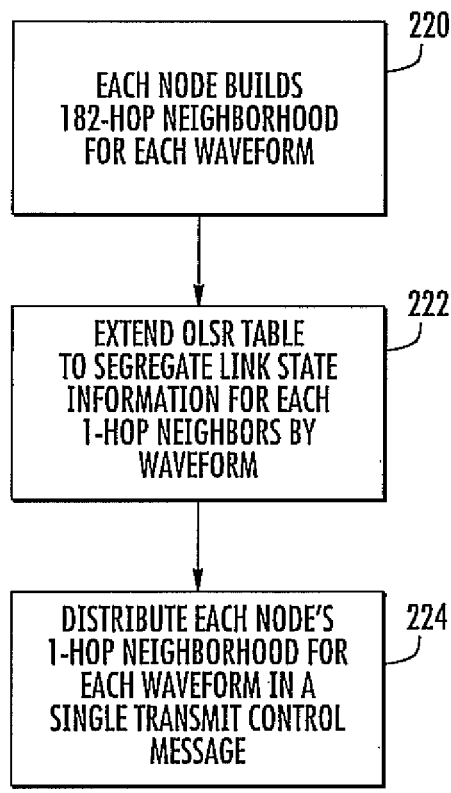
FIG. 11 is a high-level flowchart illustrating a basic single OLSR process in accordance with a non-limiting example of the present invention.

FIG. 11 shows a single OLSR process. Instead of running a parallel OLSR process in each wireless network node, only a single OLSR process is run in each node.

As shown at block 220, each node builds a 1-hop and 2-hop neighborhood for each waveform. The OLSR state table is extended to segregate link state information for each one-hop neighbor by waveform (block 222). Each MPR's selector set for each waveform is flooded in a single (periodic) transmit control message (block 224). Each receiving node then builds its own composite route table (block 226).

Figure 12:
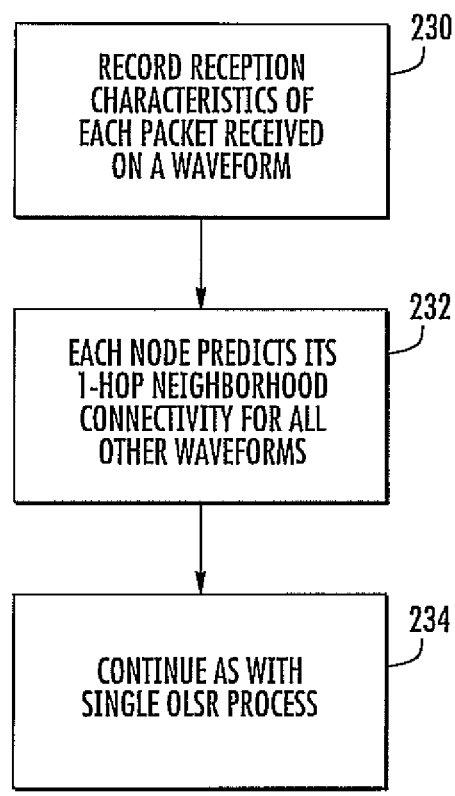
FIG. 12 is a high-level flowchart illustrating a waveform connectivity inference process.

FIG. 12 shows the waveform conductivity inference process. As shown at block 230, the reception characteristics of each received OLSR packet are recorded for the base waveform. A heuristic is used based upon OLSR packet reception characteristics and the previously characterized relative waveform performance to predict each node's one-hop neighborhood connectivity for each non-base waveform (block 232). The process continues similar to a single OLSR process (block 234).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
a plurality of mobile nodes forming a mesh network;
a plurality of wireless communication links connecting the mobile nodes together;
each mobile node comprising a communications device and operative for transmitting data packets wirelessly to other mobile nodes via the wireless communications link from a source mobile node through intermediate neighboring mobile nodes to a destination mobile node using a link state routing protocol and multiple waveforms, wherein each node is operative for predicting 1-hop neighboring connectivity using heuristics based on reception characteristics for a received packet on a base waveform that is chosen from the multiple waveforms wherein at least one of the multiple waveforms has a different range, transmission distance or reach that is greater than the other multiple waveforms resulting in different connectivity.

2. The communications system according to claim 1, wherein each mobile node is operative using multiple link state routing processes operating in parallel at a mobile node for each waveform.

3. The communications system according to claim 2, wherein each mobile node is operative for transmitting and receiving separate HELLO and topology control messages per waveform.

4. The communications system according to claim 1, and further comprising a network connectivity model at each mobile node for each waveform.

5. The communications system according to claim 4, and further comprising a routing table at each mobile node that defines wireless routes for multiple network connectivity models based on routing criteria.

6. The communications system according to claim 5, wherein said routing criteria comprises one or more of at least a minimum number of hops, minimum end-to-end latency, maximum data throughput, congestion avoidance, minimum power consumption, a minimum bandwidth and dropped packets per route.

7. The communications system according to claim 1, wherein each mobile node is operative using a single link state routing process for all waveforms by transmitting separate HELLO messages to 1-hop neighbors and flooding one topology control message per waveform.

8. The communications system according to claim 7, and further comprising a routing table at each node that segregates link state information for each 1-hop neighbor by waveform.

9. The communications system according to claim 1, wherein said reception characteristics comprise a received signal-to-noise ratio.

10. The communications system according to claim 1, wherein said link state routing protocol comprises an Optimized Link State Routing (OLSR) protocol.

11. The communications system according to claim 1, wherein the multiple waveforms have different ranges.

12. A communications system, comprising:
a plurality of wireless nodes forming a mesh network;
a plurality of wireless communication links connecting the mobile nodes together;
each wireless node comprising a communications device and operative for transmitting data packets wirelessly to other nodes via the wireless communications link from a source mobile node through intermediate neighboring mobile nodes to a destination mobile node using a link state routing protocol and a base waveform that is chosen from multiple waveforms wherein at least one of the multiple waveforms has a different range, transmission distance or reach that is greater than the other multiple waveforms resulting in different connectivity by predicting 1-hop neighborhood connectivity based on a heuristic regarding packet reception characteristics and waveform performance.

13. A communications system according to claim 12, wherein a 1-hop neighborhood connectivity is predicted for each non-base waveform.

14. A communications system according to claim 12, wherein each 1-hop neighborhood for each waveform of a mobile node is distributed via a single topology control message.

15. The communications system according to claim 12, and further comprising a network connectivity model at each mobile node for each waveform.

16. The communications system according to claim 15, and further comprising a routing table at each mobile node defined by network connectivity models.

17. The communications system according to claim 12, wherein said link state routing protocol comprises an Optimized Link State Routing (OLSR) protocol.

18. A method for communicating, comprising:
forming a mesh network from a plurality of mobile nodes;
transmitting a data packet across the mesh network from a source mobile node through intermediate neighboring mobile nodes to a destination mobile node using a link state routing protocol and multiple waveforms; and
predicting 1-hop neighboring connectivity using heuristics based on reception characteristics for a received packet on a base waveform that is chosen from the multiple waveforms wherein at least one of the multiple waveforms has a different range, transmission distance or reach that is greater than the other multiple waveforms resulting in different connectivity.

19. The method according to claim 18, which further comprises using multiple link state routing processes operating in parallel at a mobile node for each waveform.

20. The method according to claim 18, which further comprises transmitting separate HELLO and topology control messages per waveform.

21. The method according to claim 18, which further comprises building a network connectivity model at each mobile node.

22. The method according to claim 21, which further comprises building a routing table at each mobile node that defines wireless routes for multiple network connectivity models based on routing criteria.

23. The method according to claim 18, which further comprises transmitting separate HELLO messages to 1-hop neighbors and flooding one topology control message per waveform.

24. The method according to claim 18, which further comprises predicting 1-hop neighborhood connectivity based on heuristics regarding packet reception characteristics and waveform performance.

25. The method according to claim 18, which further comprises distributing each 1-hop neighborhood for each waveform via a single topology control message.

* * * * *